S. ANGART.
WORK HOLDING AND DRIVING DEVICE FOR LATHES.
APPLICATION FILED JULY 12, 1915.

1,178,203.

Patented Apr. 4, 1916.
2 SHEETS—SHEET 1.

WITNESS
T. H. Beutel.

INVENTOR.
Samuel Angart
BY
John A. Bommhardt
ATTORNEY

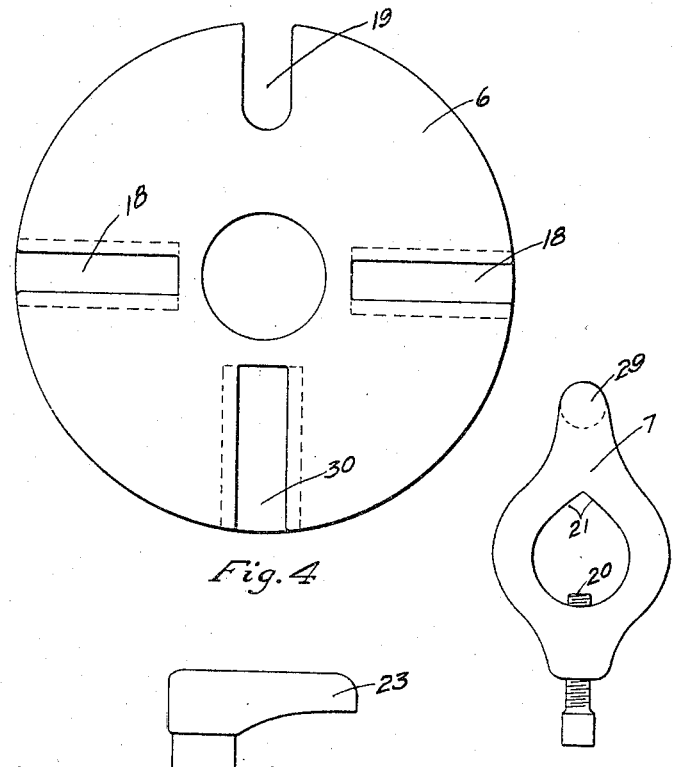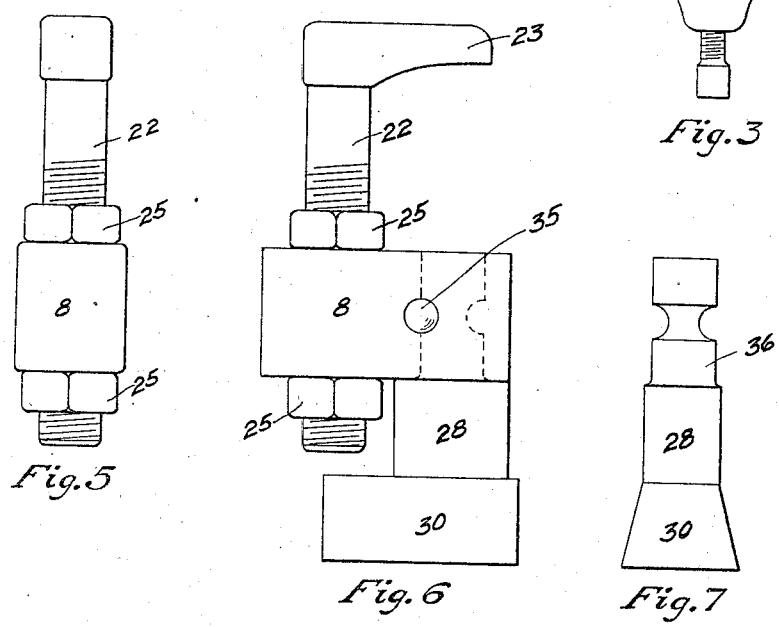

UNITED STATES PATENT OFFICE.

SAMUEL ANGART, OF CLEVELAND, OHIO.

WORK HOLDING AND DRIVING DEVICE FOR LATHES.

1,178,203. Specification of Letters Patent. Patented Apr. 4, 1916.

Application filed July 12, 1915. Serial No. 39,361.

*To all whom it may concern:*

Be it known that I, SAMUEL ANGART, citizen of the United States, residing at Cleveland, in the county of Cuyahoga and State of Ohio, have invented certain new and useful Improvements in Work Holding and Driving Devices for Lathes, of which the following is a specification.

This invention relates to work holding and driving devices for lathes, the object being to provide an improved device, used in connection with the head stock of a lathe, for holding and driving the work, and avoiding the use of belt lacing or wire often used for attaching the work.

The device comprises a dog in which the work is centered and clamped and the dog is secured to the face plate by adjustable clamping means.

Figure 1:
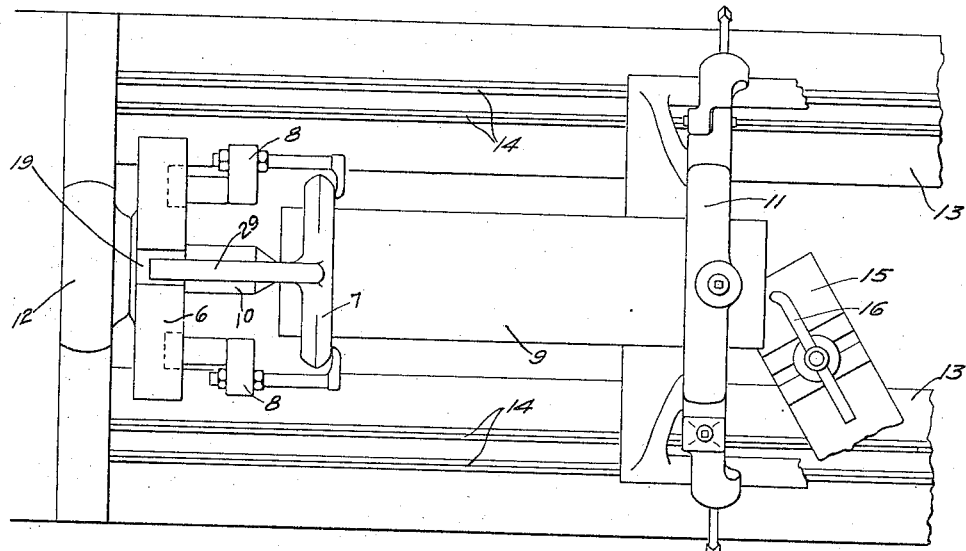
Figure 2:
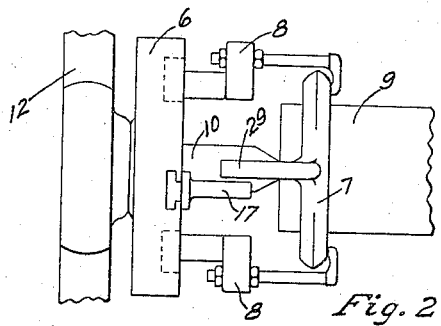
Figures 8, 9:
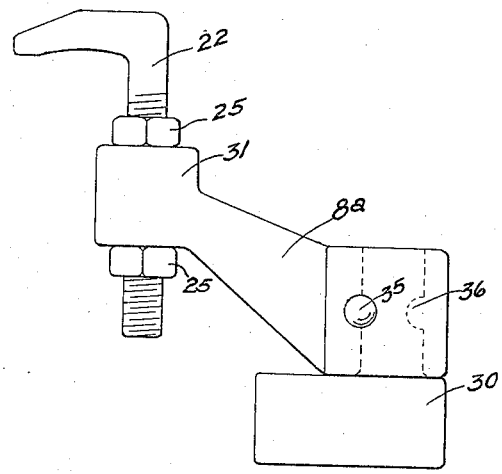

In the accompanying drawings—Figure 1 is a plan view of part of a lathe, with the invention applied thereto. Fig. 2 is a plan view of a modification. Fig. 3 is a face view of the dog. Fig. 4 is a front view of the face plate. Figs. 5, 6 and 7 are details of the clamps. Figs. 8 and 9 are side and plan views of modified clamps.

Referring specifically to the drawings, 6 indicates the face plate of the head stock, and 10 its live spindle. This plate has dovetail slots 18, and an edge notch 19, all radial.

7 is a dog in which the work 9 is held by a screw 20, being clamped against the V edges 21 of the dog ring, by a screw 20. The work is centered against the spindle 10, and clamped by means of a pair of clamps of the screw type, each consisting of an arm 8 a block 28, a screw rod 22 which screws into the arm, and a hook head 23 which engages the dog.

25 are nuts to hold the screw.

The block 28 has a dovetail base 30 which fits in a slot 18, and a grooved head pin or bearing 36 which fits in a hole in the arm 8 and is held by a pin 35. This forms a swivel connection permitting the arm 8 to be set at any angle on the block 28. It is obvious that by drawing up the screws the work is held to the live spindle.

The dog has an arm 29 which is adapted to enter the notch 19 to insure rotation of the work. Instead of the notch a stop 17 may be attached in a T slot 30 in the face plate, in proper position to contact with the arm 29 and drive the work, as shown in Fig. 2.

11 is a steady rest, 12 the shaft bracket, 13 the base, 14 the guides, 15 the tool carriage, and 16 the cutting tool, all of ordinary or suitable construction.

In operation, the work is clamped in the dog and is then centered and the dog clamped to the face plate by means of the clamps, to hold and drive the work during the operations thereon.

In Figs. 8 and 9 the arm 8ª has the form of an arm projecting at an angle, and it is pivoted directly to the base 30.

What I claim as new is:

The combination with a rotary face plate, and a work-holding dog, of a block adjustable on said plate, an arm pivoted to the block to swing in a plane parallel to the face plate, and a screw hook screwed into the outer end of the arm and projecting parallel to the axis of the face plate in position to engage the hook with the dog on the side thereof opposite to the face plate.

In testimony whereof, I affix my signature in presence of two witnesses.

SAMUEL ANGART.

Witnesses:
JOHN A. BOMMHARDT,
J. B. DOMS.

Copies of this patent may be obtained for five cents each, by addressing the "Commissioner of Patents, Washington, D. C."